(12) United States Patent
Lehavi et al.

(10) Patent No.: US 8,438,262 B2
(45) Date of Patent: May 7, 2013

(54) METHOD AND SYSTEM FOR ANALYSIS OF MESSAGE TRANSACTIONS IN A DISTRIBUTED SYSTEM

(75) Inventors: David Lehavi, Haifa (IL); Ariel Shaqed, Ramat-Aviv (IL)

(73) Assignee: Correlix Ltd., Herzeliya (IL)

( * ) Notice: Subject to any disclaimer, the term of this patent is extended or adjusted under 35 U.S.C. 154(b) by 0 days.

(21) Appl. No.: 13/521,802

(22) PCT Filed: Jan. 12, 2011

(86) PCT No.: PCT/IL2011/000035
§ 371 (c)(1),
(2), (4) Date: Jul. 12, 2012

(87) PCT Pub. No.: WO2011/086549
PCT Pub. Date: Jul. 21, 2011

(65) Prior Publication Data
US 2012/0296996 A1    Nov. 22, 2012

Related U.S. Application Data

(60) Provisional application No. 61/294,204, filed on Jan. 12, 2010.

(51) Int. Cl.
*G06F 15/173* (2006.01)
(52) U.S. Cl.
USPC ............ 709/223; 709/203; 709/217; 709/224
(58) Field of Classification Search .................. 709/223, 709/224, 203, 217, 219
See application file for complete search history.

(56) References Cited

U.S. PATENT DOCUMENTS

| | | | |
|---|---|---|---|
| 7,032,032 B2 * | 4/2006 | Loprieno | 709/246 |
| 7,362,709 B1 * | 4/2008 | Hui et al. | 370/237 |
| 7,720,773 B2 * | 5/2010 | Szummer et al. | 706/20 |
| 8,140,580 B2 * | 3/2012 | Rehm et al. | 707/791 |
| 2006/0126495 A1 * | 6/2006 | Guichard et al. | 370/216 |
| 2006/0287842 A1 * | 12/2006 | Kim | 702/183 |
| 2009/0238084 A1 | 9/2009 | Nadeau | |
| 2010/0153454 A1 * | 6/2010 | Rehm et al. | 707/791 |
| 2011/0016316 A1 * | 1/2011 | Amir et al. | 713/168 |
| 2011/0243030 A1 * | 10/2011 | Zhang et al. | 370/254 |
| 2012/0096475 A1 * | 4/2012 | Johnson et al. | 719/314 |
| 2012/0179740 A1 * | 7/2012 | Shaqed et al. | 709/201 |
| 2012/0195229 A1 * | 8/2012 | Chen | 370/254 |
| 2012/0290705 A1 * | 11/2012 | Befort et al. | 709/224 |

FOREIGN PATENT DOCUMENTS

| | | |
|---|---|---|
| EP | 1976183 A2 | 10/2008 |
| WO | 2007/089183 A1 | 8/2007 |

* cited by examiner

*Primary Examiner* — Lashonda Jacobs
(74) *Attorney, Agent, or Firm* — Browdy and Neimark, PLLC

(57) ABSTRACT

The invention provides a method and system for fusing message paths that occurred in a first domain in a communication network, with message paths that occurred in a second domain in the communication network a communication channel exists between the two domains. A first message path that occurred in the first domain and included a message sent to the second domain along the communication channel is fused to a second path that occurred in the second domain that included the message received from the first domain. Each message that is transmitted in the communication channel between the two domains is assigned a message unique identifier that allows each domain to associate a message sent from one domain to the other with a response message sent in the opposite direction.

22 Claims, 5 Drawing Sheets

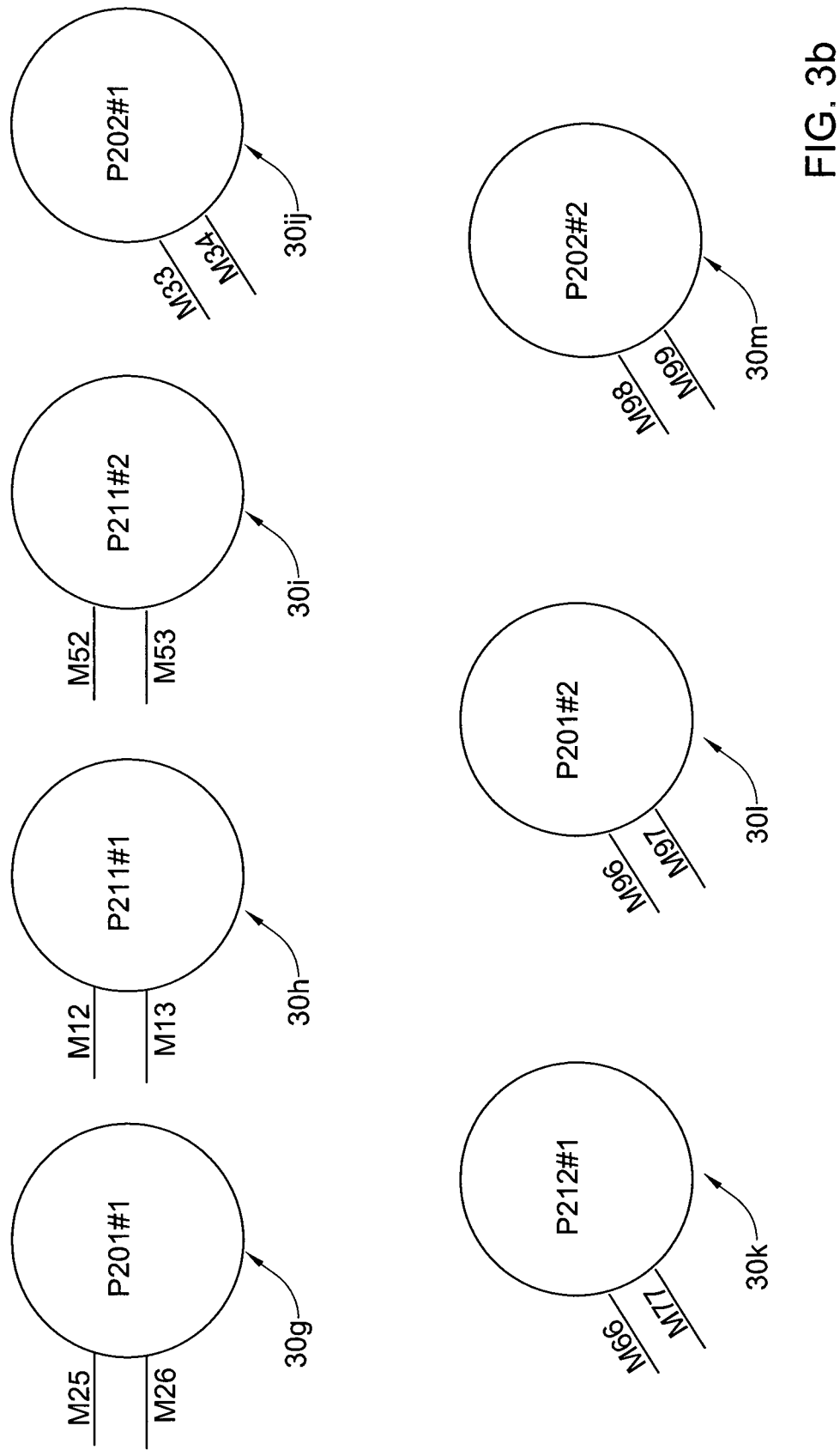

METHOD AND SYSTEM FOR ANALYSIS OF MESSAGE TRANSACTIONS IN A DISTRIBUTED SYSTEM

FIELD OF THE INVENTION

This invention relates to methods and systems for monitoring message transactions in one or more communication networks.

BACKGROUND OF THE INVENTION

The present invention relates to methods and systems for monitoring message transactions in a communication network that is divided into two or more domains. For example, a communication network used in commerce may have one or more "consumer domains" and one or more "provider domains". Nodes of a consumer domain may send messages to other nodes in a consumer domain, generating one or more messages among nodes of the consumer domain, and, a node of a consumer domain may send a message to a node of a provider domain over a communication channel between the two domains. Receipt of the order message at the provider domain may generate one or more messages among the nodes of the provider domain as well as a response message sent from a node of the provider domain to a node of the consumer domain. Receipt of the response message at the consumer domain may generate one or more messages among the nodes of the consumer domain.

The entire transaction between the consumer and provider domains would thus include several messages, some of which occurred in the consumer domain, some occurred in the provider domain, and some occurred in a communication channel between the two domains. Each domain may have a processor, referred to as a collector, that collects data relating to messages received at and sent from nodes of the domain. The collected data may be used to reconstruct message paths that occurred in the domain and to evaluate the performance of the domain.

When the consumer domain receives the response message that was sent in response to the order message, the processor receiving data from the collector of the consumer can determine the response time, i.e. the time between the consumer' domain's sending of the order message and receipt by the consumer domain of the provider's response message. The processor can also determine various other times occurring between the domains, such as the time elapsed from the generation of order message in the consumer domain to its receipt on some machine in the provider domain. The consumer domain collector thus has the capability of collecting such response times over a time period and performing various statistical analyses of the transaction times. For example, for a given type of order message and a given type of response message, the processor may calculate an average and standard deviation of the time lapse between dispatching the order message and receiving the response message. If the processor or the consumer domain collector discover that for a given combination of order and response messages the time lapse is too long, the consumer domain may inform the provider domain of this situation with the expectation that the provider will act to remedy the situation, or the consumer domain may take other steps in response.

Each domain is typically administered by a different authority. Furthermore, regulations may be in place preventing the consumer from being allowed to monitor the provider domain. Thus, in the above example, the consumer domain collector would not have access to data on the message transactions that occurred in the provider domain upon receipt of the order message. Similarly, the provider domain collector would not have access to information relating to the message transactions that occurred in the consumer domain upon receipt of the response message at the consumer domain. While each collector can reconstruct message paths that occurred on its domain and evaluate the performance of its domain, and the response time of the other domain, neither collector can see the entire message path that occurred on both domains. Thus, it is not possible to reconstruct the entire message path; so that any type of assessment of the performance the portion of the network formed by the two domains is not possible.

SUMMARY OF THE INVENTION

The present invention provides a system and method for evaluating performance of at least a portion of a communication network that is divided into two or more domains. One or more communication channels exist between at least some pairs of domains. Each domain has an associated collector configured to collect data related to messages sent from and received at nodes of the domain.

In accordance with the invention, the system of the invention includes a processor configured to receive data collected by two or more of the collectors. The processor is configured to process the data received from the collectors and to reconstruct message paths that occurred in two or more of the domains. The processor may further be configured to collect data over time relating to the reconstructed message paths in order to evaluate the performance at least a portion of the network including two or more domains.

In accordance with the method of the invention, when a first message is sent from a node of a first domain to a node of a second domain, the sending node appends to the first message a unique message identifier (MUID). A second message, sent in response to the first message, from a node of the second domain to a node of the first domain will include the MUID of the first message as well a MUID of the second message generated by the sending node of the response message. This allows the collector of the first domain to associate the first and second messages, and to identify the first and second messages as part of a message path that occurred on at least the first and second domains. As described in detail below, the processor of the system is configured to utilize the MUIDs of messages sent between domains to fuse two or more domain message paths, where each domain message path occurred in a single domain, into a single system message path that occurred in two or more domains.

Thus, in its first aspect, the present invention provides a method for fusing one or more instances of one or more message paths observed by a first collector to one or more instances of one or more message paths observed by a second collector, the first collector collecting message data from a first domain in a communication network, and the second collector collecting message data from a second domain in the communication network, there being one or more communication channels between the first and second domains, the first collector monitoring messages received in the first domain or sent from the first domain via the one or more communication channels, the second collector monitoring messages received in the second domain or sent from the first domain via the one or more communication channels, wherein each message transmitted on any one of the one or more communication channels has an associated message unique identifier (MUID), the method comprising:

(a) receiving from the first collector data indicative of instances of one or more message paths that occurred in the first domain and receiving from the second collector data indicative of instances of one or more message paths that occurred in the second domain, the data including a path unique identifier (PUID) of each instance of each of the one or more message paths, and the data including, for each message transmitted on one of the one or more communication channels, a MUID of the message; and (b) for each of one or more instances of a first message path observed by the first collector, fusing the message path to a second message path observed the second collector, wherein the first and second message paths include a message having the same MUID.

In the method of the invention, the step (b) above can be performed a number of times as required until all possible fusions have been made.

The method may further comprise a step of generating a undirected graph in which every MUID in the received data is a node, and in which two nodes are joined together with an edge if the received data includes an instance of a PUID that included the two nodes of the graph, and step (b) is performed on connected components of the graph. The method may yet further comprise a step of removing connected components of the graph containing at least one MUID observed by only one of the collectors in the received data, and step (b) is performed after removal of the connected components from the graph containing at least one MUID observed by only one of the collectors in the received data.

The method may further comprise synchronizing a first clock of the first collector and a second clock of the second collector, wherein the synchronization comprises calculating a time difference between the two clocks based on arrival and departure times of messages in the communication channel between the two domains. Calculating the time difference may involve one or both of (a) comparing a time on the first clock that a message was sent from the first domain with a time on the second clock that the message was received in the second domain, and (b) comparing a time on the second clock that a message was sent from the second domain with a time on the first clock that the message was received in the first domain.

The method of the invention may further comprise calculating one or more values of one or more parameters of one or more of the fused message paths. One or more of the parameters may be, for example, a transit time on at least a portion of the fused message path, and a processing time at each of one or more nodes in the fused path. An alert may be issued when a determined value of one or more of the parameters exceeds a predetermined threshold. Statistics of one or more of the parameters of one or more nodes or paths or messages may be calculated. An alert when the value of any statistic exceeds a predetermined threshold.

In its second aspect, the invention provides a system for fusing one or more instances of one or more message paths observed by a first collector to one or more instances of one or more message paths observed by a second collector, the first collector collecting message data from a first domain in a communication network, and the second collector collecting message data from a second domain in the communication network, there being one or more communication channels between the first and second domains, the first collector monitoring messages received in the first domain or sent from the first domain via the one or more communication channels, the second collector monitoring messages received in the second domain or sent from the first domain via the one or more communication channels, wherein each message transmitted on any one of the one or more communication channels has an associated message unique identifier MUID, the system comprising a processor configured to:

(a) receive from the first collector data indicative of instances of one or more message paths that occurred in the first domain and receive from the second collector data indicative of instances of one or more message paths that occurred in the second domain, the data including a path unique identifier (PUID) of each instance of each of the one or more message paths, and the data including, for each message transmitted on one of the one or more communication channels, a MUID of the message; and (b) for each of one or more instances of a first message path observed by the first collector, fuse the message path to a second message path observed the second collector, wherein the first and second message paths include a message having the same MUID.

The processor may further be configured to perform step (b) a number of times as required until all possible fusions have been made. The processor may be further configured to execute a step of generating an undirected graph in which every MUID in the received data is a node, and in which two nodes are joined together with an edge if the received data includes an instance of a PUID that included the two nodes of the graph, and step (b) is performed on connected components of the graph. The processor may be further configured to execute a step of removing connected components of the graph containing at least one MUID observed by only one of the collectors in the received data, and step (b) is performed after removal of the connected components from the graph containing at least one MUID observed by only one of the collectors in the received data.

The processor may be further configured to perform synchronizing a first clock of the first collector and a second clock of the second collector, wherein the synchronization comprises a step of calculating a time difference between the two clocks based on arrival and departure times of messages in the communication channel between the two domains. The step of calculating the time difference may involve one or both of (a) comparing a time on the first clock that a message was sent from the first domain with a time on the second clock that the message was received in the second domain, and (b) comparing a time on the second clock that a message was sent from the second domain with a time on the first clock that the message was received in the first domain.

The processor may be further configured to execute a step of calculating one or more values of one or more parameters of one or more of the fused message paths. One or more of the parameters may be, for example, selected from a transit time on at least a portion of the fused message path, and a processing time at each of one or more nodes in the fused path. The processor may be further configured to issue an alert when a determined value of one or more of the parameters exceeds a predetermined threshold. The processor is further configured to execute a step of calculating statistics of one or more of the parameters of one or more nodes, messages or paths. An alert may be issued when the value of any statistic exceeds a predetermined threshold.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 3b shows schematically seven component message paths that occurred in a second domain of the communication network of FIG. 1.

DETAILED DESCRIPTION OF EMBODIMENTS

Figure 1:
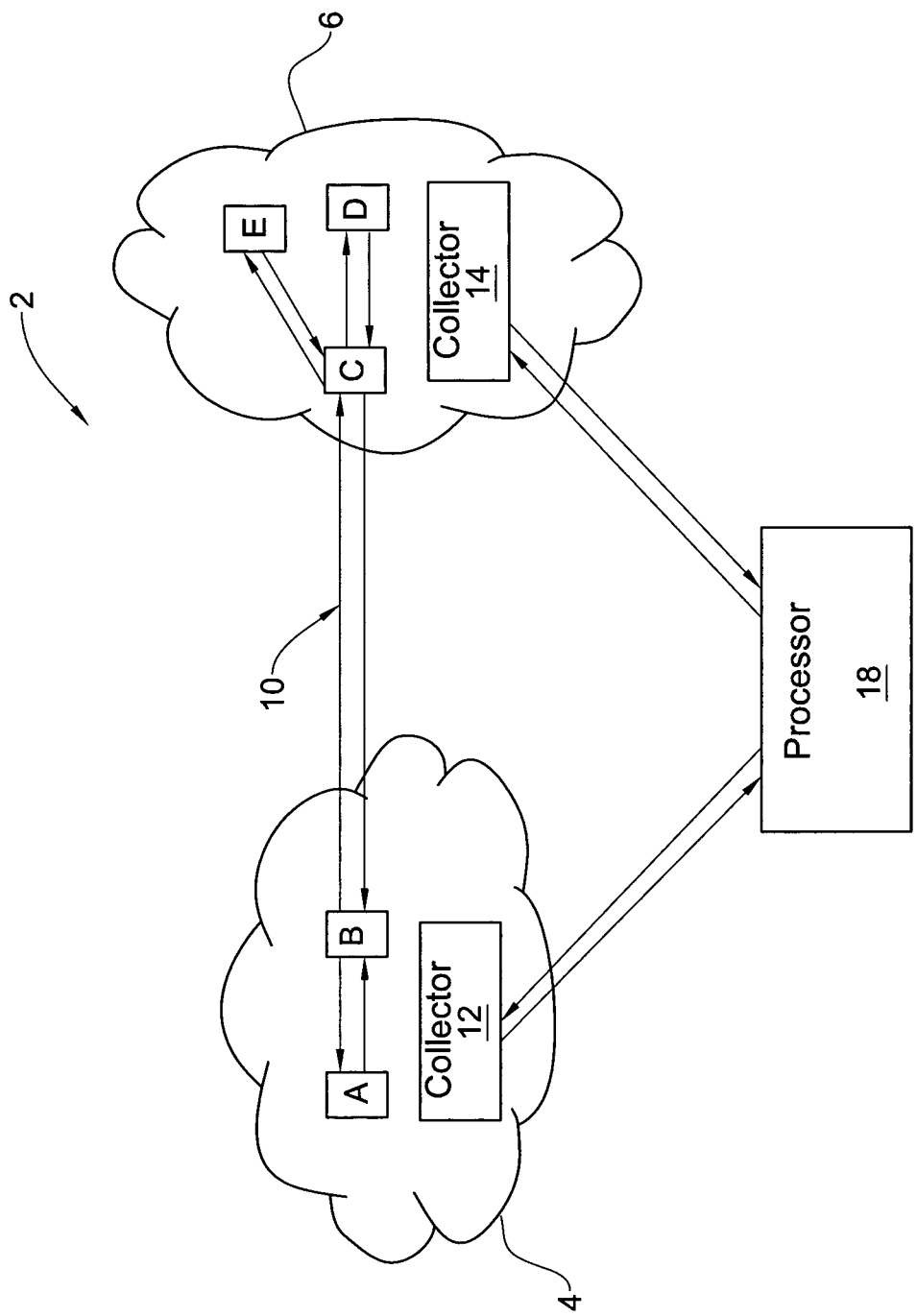
FIG. 1 shows a communication network comprising two or more domains, in accordance with the invention.

FIG. 1 shows a communication network 2 comprising two or more domains. For simplicity of the description, only two domains are shown in FIG. 1, a first domain 4 and a second domain 6. This is by way of example only, and the communication network 2 may comprise any number of domains that is at least two. The first domain 4 comprises one or more nodes, of which two nodes are shown in FIG. 1, a node A and a node B. Similarly, the second domain 6 comprises one or more nodes, of which three nodes are shown in FIG. 1, a node C a node D and a node E. Nodes in the first domain can exchange messages among themselves within the first domain, and nodes in the second domain can exchange messages among themselves within the second domain. In addition, the node B of the first domain and the node C of the second domain can send messages between them via a communication channel 10. The first domain 4 has an associated collector 12 and the second domain 6 has an associated collector 14. As explained above, each collector collects data related to messages received at, and sent from, nodes of the collector's domain. Typically, the data will include, for each message, its source node, its destination node, its sent time, and its received time. Each collector is configured to generate message paths that occurred in its domain from the collected data.

The system 2 further includes a processor 18 that is configured to receive from the collectors 12 and 14 message paths reconstructed by the collectors 12 and 14, and to reconstruct from the method paths that occurred on each domain into message paths occurring in two or more of the domains.

Figure 2:
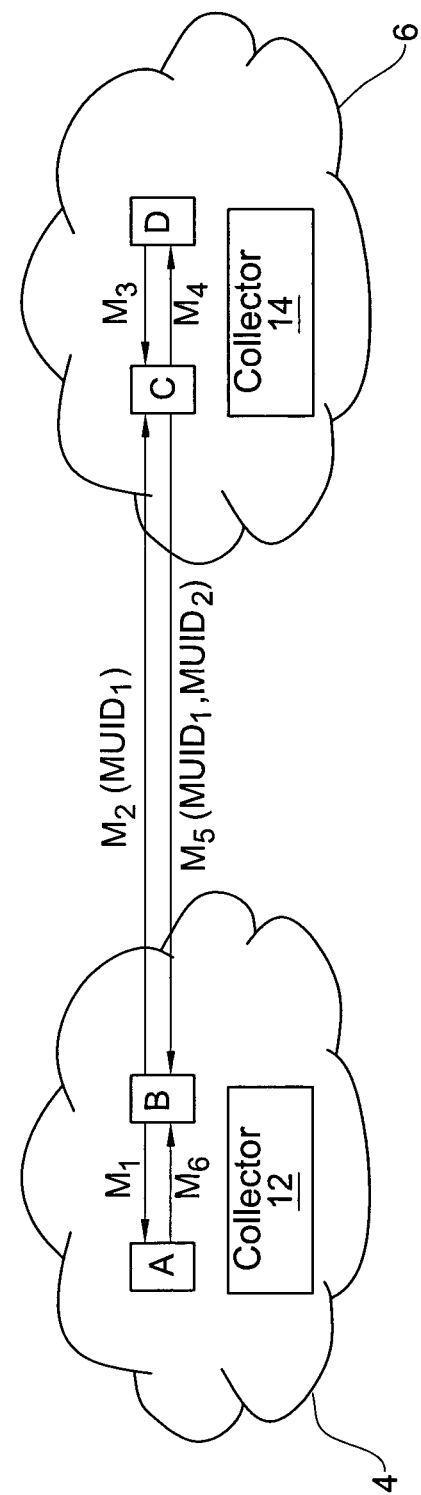
FIG. 2 shows a message path in the communication network of FIG. 1.

As an example, a message path may be generated in the system 2 comprising the following sequence of message transactions, shown schematically in FIG. 2:

(a) A message M1 from the node A to the node B in the first domain 4.
(b) A message M2 sent in response to the message M1, from the node B of the first domain to the node C of the second domain together with $MUID_1$ of the IOC message.
(c) A message M3 is then sent from node C to node D.
(d) A message M4 from node D to node C is then generated.
(e) A message M5 is sent from node C to node B together with $MUID_1$ of the message M2 and the $MUID_2$ of the message M5.
(f) A message M6 from B to A.

Each of the transactions in the above paths is seen by only one of the collectors 12 and 14. The collector 12 of the first domain 4 sees the messages M1, M2, M5, and M6. The collector 12 does not see the messages M3 and M4. Since the message M5 includes the $MUID_1$ of the message M2, it follows from the data available to the collector 12, that the message M5 was sent in response to M2. The collector 12 can then reconstruct the following message path that occurred in the first domain 4:

$$M1 \rightarrow M2 \rightarrow M5 \rightarrow M6 \qquad (1)$$

Each type of message path (for instance, "order message of stock X containing order message of stock X from node A to node B, followed by order message of stock X from node B to node C, followed by acknowledgement message from node C to node B, followed by acknowledgement message from node B to node A) that can occur in the first domain 4 is assigned a unique path identifier (PUID). For example, the path (1) above may be assigned the PUID 1. Multiple message paths may have the same PUID (for instance, multiple acknowledged order transactions of stock X may occur between the three nodes A, B and C).

Similarly, the collector 14 of the second domain sees the messages M2, M3, M4, and M5. Furthermore, the collector 14 knows that the message M5 was sent in response to the message M2. The collector 14 does not see the messages M1 and M6. The collector 14 can then reconstruct the following message path that occurred in the second domain 6:

$$M2 \rightarrow M3 \rightarrow M4 \rightarrow M5 \qquad (2)$$

Each type of message path that can occur in the second domain 6 is also assigned a unique path identifier (PUID). For example, the path (2) above may be assigned the PUID 2.

The two reconstructed message paths (1) and (2) which occurred in the first and second domains, respectively, are communicated to the processor 18, which is configured to fuse the two message paths (1) and (2) in order to reconstruct the entire message path (M1→M2→M3→M4→M5→M6), as explained below.

Figure 3A:
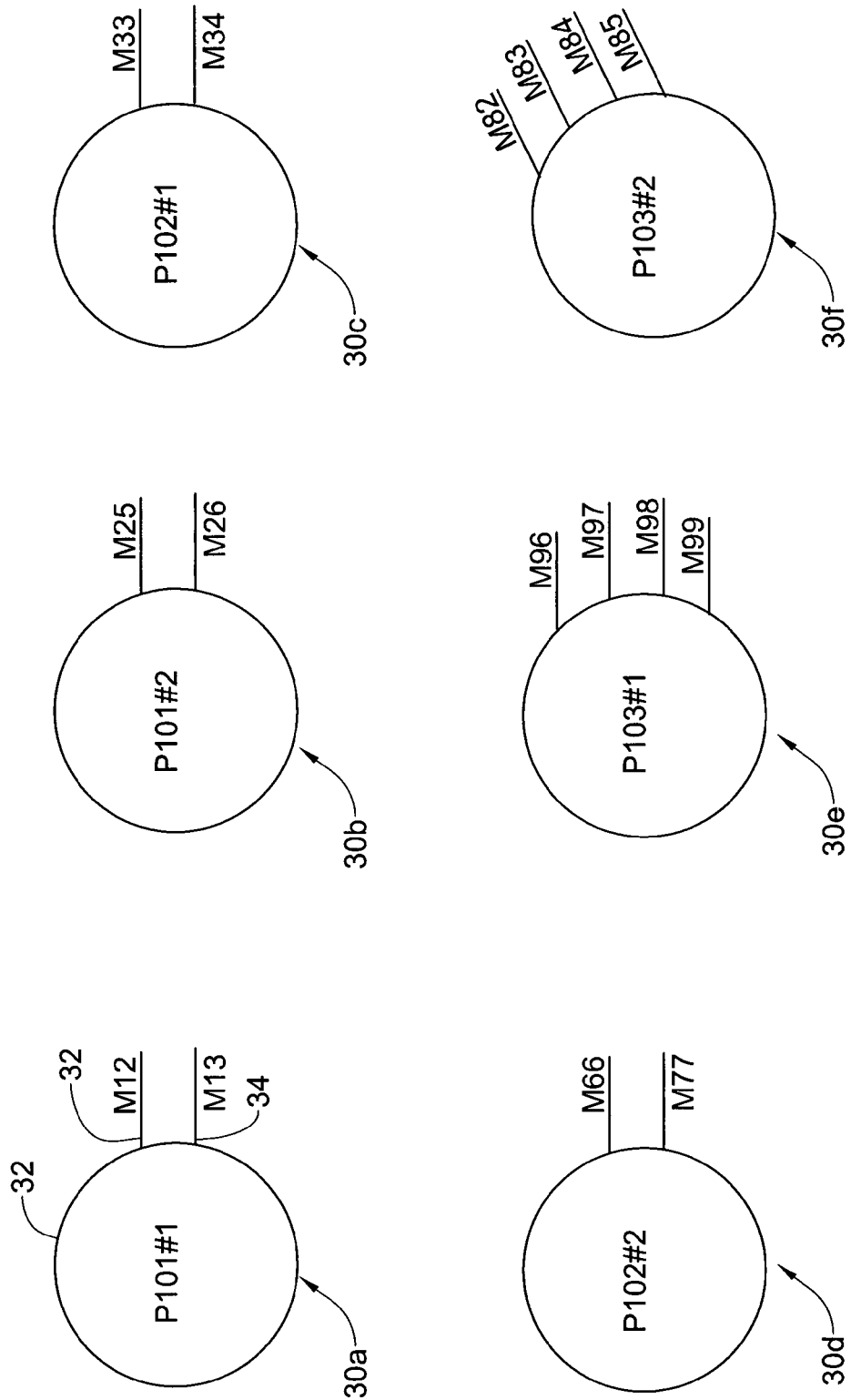
FIG. 3a shows schematically six component message paths that occurred in a first domain of the communication network of FIG. 1.

As a more complex example, the collector 12 may generate the following component paths that occurred in the domain 4 (the component paths are represented schematically in FIGS. 3a and 3b):

(a) A first component path having the PUID P101 that included one or messages with the MUIDs M12, M13. This component path is shown schematically in FIG. 3a and labeled as 30a, in which a circle 32 represents the message transactions of the path that occurred among nodes in the domain 4, a first line 32 represents a first message between the nodes B (in domain 4) and C (in domain 6) having the MUID M12, and a second line 34 represents a message between the nodes C (in domain 6) and B (in domain 4) having the MUID M3. The circle 32 is labeled with the PUID of the path (P101) and a cardinal number of the occurrence of this PUID (#1).

(b) A second path 30b having the PUID P101 that included one or messages with MUIDs M25, M26.

(c) A first path 30c having the PUID P102 that included one or messages with MUIDs M33, M44.

(d) A second path 30d having the PUID P102 that included one or messages with MUIDs M66, M77.

(e) A first path 30e having the PUID P103 that included one or messages with MUIDs M96, M97, M98, and M99.

(f) A second path 30f having the PUID P103 that included one or messages with MUIDs M82, M83, M84, M85.

Similarly, the collector 14 may generate the following component paths:

(g) A first path 30g (FIG. 3b) having the PUID P201 that included one or more messages with the MUIDs M25, M26.

(h) A first path 30h having the PUID P211 that included one or more messages with MUIDs M12, M13.

(i) A second path 30*i* having the PUID P211 that included one or more messages with MUIDs M52, M53.
(j) A first path 30*j* having the PUID P202 that included one or more messages with MUIDs M33, M44.
(k) A first path 30*k* having the PUID P212 that included one or more messages with MUIDs M66, M77.
(l) A second 30*l* path having the PUID P201 that included one or more messages with MUIDs M96, M97.
(m) A second path 30*m* having the PUID P202 that included one or more messages with MUIDs M98, M99.

Visual inspection of the component paths that occurred in the domains 4 (FIG. 3*a*) and 6 (FIG. 3*b*) shows that the component path 30*a* that occurred in the domain 4 can be fused to the component path 30*h* that occurred in the domain 6 to because the two component paths 30*a* and 30*h* include a common pair of messages between the two domains (the messages having the MUIDs M12 and M13). This generates a message path having nodes in both domains. Similarly, the component paths 30*b*, 30*c*, and 30*d* that occurred in the domain 4 can be fused to the component paths 30*g*, 30*j*, and 30*k*, respectively, that occurred in the domain 6. Furthermore, the paths 30*m* and 30*l* in the domain 6 can be fused simultaneously to the component path 30*e* in the domain 4. The component paths 30*f* and 30*i* are not fused to any of the other component graphs shown in either FIG. 3*a* or 3*b*.

In one embodiment of the invention, reconstruction of a message path that occurred in the system 2 by fusion of two or more component message paths that occurred in each of two or more different domains comprises constructing a undirected graph. Every MUID of all of the component message paths is a node of this graph. Two nodes are connected by edges if at least one of the component paths included a message containing both MUIDs.

Figure 4:
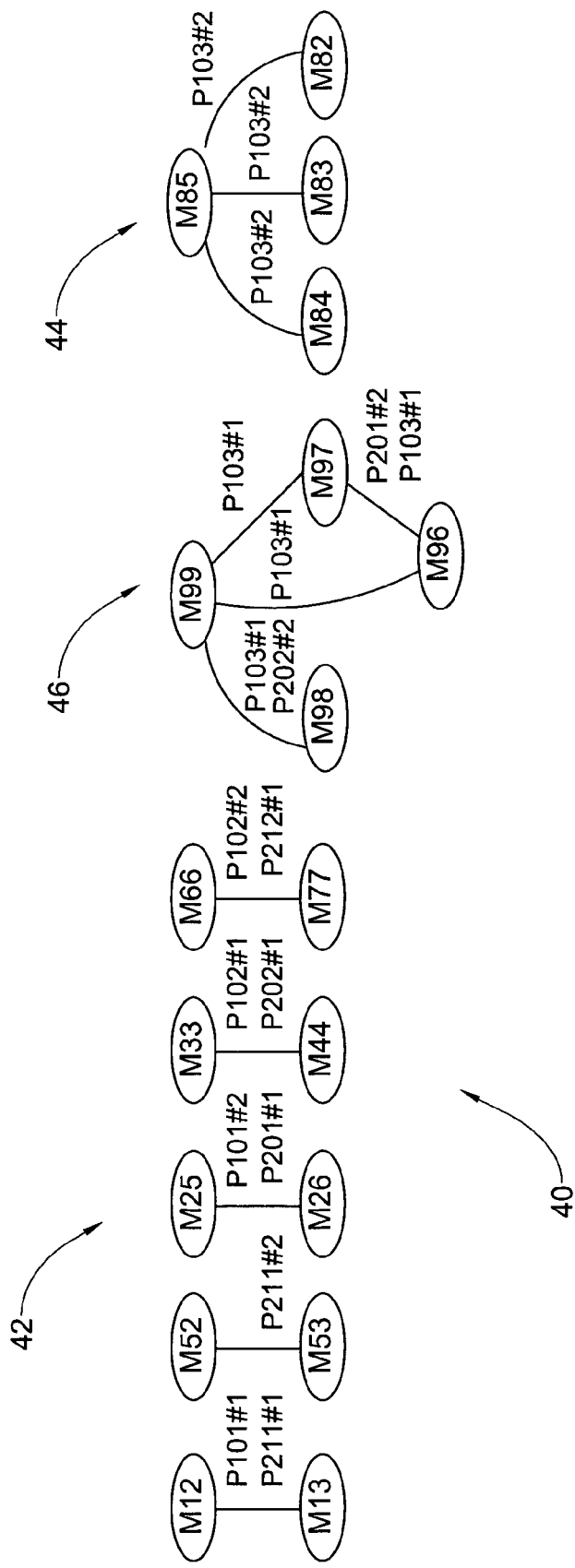
FIG. 4 shows a unidirectional graph derived from the component message paths of FIGS. 3a and 3b.

FIG. 4 shows a unidirectional graph 40 derived from the component paths 30*a* to 30*m*. For each edge in the graph, all component paths including a message having the two MUIDS of the edge are indicated next to the edge by the PUID of the path and the Cardinal number of the instance of the PUID. Component graphs having an edge with only one associated PUID are preferably deleted, since they cannot be fused to any other component graph. In the graph 40 of FIG. 4, the component graphs that are deleted are the component graphs 42 and 44. The component graph 46 is not deleted because all its nodes (MUIDs) are reached by a PUID (path) from each collector: all 4 nodes are reached by P103#1 from the first collector, and each node is also reached either by P202#2 or by P201#2 from the second collector.

The edges remaining after any deletion of edges indicate the component paths to be fused.

Fusing component paths into a composite path may be expensive computationally, thus in one embodiment of the invention a new path object is created the first time a particular combination of component paths (as identified by their PUIDs) are to be fused, and hashing fusing instructions to create a unique Fusing Unique IDentifier (FUID) that is applied each time the same combination of component paths is to be fused. This unique identifier identifies the resulting path as uniquely as the PUIDs identify paths, but is based on different information. A map from FUIDs to PUIDs and the actual structure of that PUID can thus be provided. The next time these same fusing instructions are required, it is only necessary to compute the FUID to get the PUID and the final path structure.

In the system 2 of the invention, the processor 18 may be configured to synchronize the clocks of the first and second collectors. The synchronization may be accomplished, for example, by calculating a time difference between the two clocks based on arrival and departure times of messages in the communication channel between the two domains. Over a short period of time we may assume the time difference between the clocks is fixed. The departure time of a message must precede its arrival, so every message in a transaction transferred between the two domains gives either an upper bound or a lower bound on the time difference between the clocks. Therefore, if messages flow in both directions in the communication channel between the two domains, the time difference will be bounded from above and below, allowing it to be estimated.

The invention claimed is:

1. A method for fusing one or more instances of one or more message paths observed by a first collector to one or more instances of one or more message paths observed by a second collector, the first collector collecting message data from a first domain in a communication network, and the second collector collecting message data from a second domain in the communication network, there being one or more communication channels between the first and second domains, the first collector monitoring messages received in the first domain or sent from the first domain via the one or more communication channels, the second collector monitoring messages received in the second domain or sent from the first domain via the one or more communication channels, wherein each message transmitted on any one of the one or more communication channels has an associated message unique identifier (MUID), the method comprising:
   a. receiving from the first collector data indicative of instances of one or more message paths that occurred in the first domain and receiving from the second collector data indicative of instances of one or more message paths that occurred in the second domain, the data including a path unique identifier (PUID) of each instance of each of the one or more message paths, and the data including, for each message transmitted on one of the one or more communication channels, a MUID of the message; and
   b. for each of one or more instances of a first message path observed by the first collector, fusing the message path to a second message path observed the second collector, wherein the first and second message paths include a message having the same MUID.

2. The method according to claim 1 wherein step (b) is performed a number of times as required until all possible fusions have been made.

3. The method according to claim 1 further comprising a step of generating a undirected graph in which every MUID in the received data is a node, and in which two nodes are joined together with an edge if the received data includes an instance of a PUID that included the two nodes of the graph, and step (b) is performed on connected components of the graph.

4. The method according to claim 3 further comprising a step of removing connected components of the graph containing at least one MUID observed by only one of the collectors in the received data, and step (b) is performed after removal of the connected components from the graph containing at least one MUID observed by only one of the collectors in the received data.

5. The method according claim 1 further comprising synchronizing a first clock of the first collector and a second clock of the second collector, wherein the synchronization comprises calculating a time difference between the two clocks based on arrival and departure times of messages in the communication channel between the two domains.

6. The method according to claim 5 wherein calculating the time difference involves one or both of (a) comparing a time on the first clock that a message was sent from the first domain with a time on the second clock that the message was received in the second domain, and (b) comparing a time on the second clock that a message was sent from the second domain with a time on the first clock that the message was received in the first domain.

7. The method according to claim 1 further comprising calculating one or more values of one or more parameters of one or more of the fused message paths.

8. The method according to claim 7 wherein one or more of the parameters is selected from a transit time on at least a portion of the one or more of the fused message paths, and a processing time at each of one or more nodes in the one or more of the fused paths.

9. The method according to claim 7 further comprising issuing an alert when a determined value of one or more of the parameters exceeds a predetermined threshold.

10. The method according claim 7 further comprising calculating statistics of one or more of the parameters of one or more nodes, messages or paths.

11. The method according to claim 10 further comprising issuing an alert when the value of any statistic exceeds a predetermined threshold.

12. A system for fusing one or more instances of one or more message paths observed by a first collector to one or more instances of one or more message paths observed by a second collector, the first collector collecting message data from a first domain in a communication network, and the second collector collecting message data from a second domain in the communication network, there being one or more communication channels between the first and second domains, the first collector monitoring messages received in the first domain or sent from the first domain via the one or more communication channels, the second collector monitoring messages received in the second domain or sent from the first domain via the one or more communication channels, wherein each message transmitted on any one of the one or more communication channels has an associated message unique identifier MUID, the system comprising a processor configured to:
  a. receive from the first collector data indicative of instances of one or more message paths that occurred in the first domain and receive from the second collector data indicative of instances of one or more message paths that occurred in the second domain, the data including a path unique identifier (PUID) of each instance of each of the one or more message paths, and the data including, for each message transmitted on one of the one or more communication channels, a MUID of the message; and
  b. for each of one or more instances of a first message path observed by the first collector, fuse the message path to a second message path observed the second collector, wherein the first and second message paths include a message having the same MUID.

13. The system according to claim 12 wherein the processor is configured to perform step (b) a number of times as required until all possible fusions have been made.

14. The system according to claim 12, wherein the processor is further configured to execute a step of generating an undirected graph in which every MUID in the received data is a node, and in which two nodes are joined together with an edge if the received data includes an instance of a PUID that included the two nodes of the graph, and step (b) is performed on connected components of the graph.

15. The system according to claim 14 wherein the processor is further configured to execute a step of removing connected components of the graph containing at least one MUID observed by only one of the collectors in the received data, and step (b) is performed after removal of the connected components from the graph containing at least one MUID observed by only one of the collectors in the received data.

16. The system according claim 12 wherein the processor is further configured to perform synchronizing a first clock of the first collector and a second clock of the second collector, wherein the synchronization comprises a step of calculating a time difference between the two clocks based on arrival and departure times of messages in the communication channel between the two domains.

17. The system according to claim 16 wherein the step of calculating the time difference involves one or both of (a) comparing a time on the first clock that a message was sent from the first domain with a time on the second clock that the message was received in the second domain, and (b) comparing a time on the second clock that a message was sent from the second domain with a time on the first clock that the message was received in the first domain.

18. The system according to claim 12 wherein the processor is further configured to execute a step of calculating one or more values of one or more parameters of one or more of the fused message paths.

19. The system according to claim 18 wherein one or more of the parameters is selected from a transit time on at least a portion of the one or more of the fused message paths, and a processing time at each of one or more nodes in the one or more of the fused paths.

20. The system according to claim 18 wherein the processor is further configured to issue an alert when a determined value of one or more of the parameters exceeds a predetermined threshold.

21. The system according to claim 18 wherein the processor is further configured to execute a step of calculating statistics of one or more of the parameters of one or more nodes, messages or paths.

22. The system according to claim 21 wherein the processor is further configured to execute a step of issuing an alert when the value of any statistic exceeds a predetermined threshold.

* * * * *